(12) United States Patent
Alhooshani et al.

(10) Patent No.: US 9,663,724 B2
(45) Date of Patent: May 30, 2017

(54) METHOD USING ALUMINA-ZINC OXIDE-NICKEL OXIDE COMPOSITE FOR DESULFURIZATION OF HYDROCARBONS

(71) Applicants: KING FAHD UNIVERSITY OF PETROLEUM AND MINERALS, Dhahran (SA); King Abdulaziz City for Science and Technology, Riyadh (SA)

(72) Inventors: Khalid R. Alhooshani, Dhahran (SA); Abdullah A. Al Swat, Dhahran (SA); Tawfik A. Saleh, Dhahran (SA); Mohammad N. Siddiqui, Dhahran (SA); Mohammed A. Gondal, Dhahran (SA)

(73) Assignees: King Fahd University of Petroleum and Minerals, Dhahran (SA); King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 15/172,689

(22) Filed: Jun. 3, 2016

(65) Prior Publication Data

US 2016/0281004 A1 Sep. 29, 2016

Related U.S. Application Data

(62) Division of application No. 14/144,114, filed on Dec. 30, 2013, now Pat. No. 9,421,516.

(51) Int. Cl.
*C10G 25/00* (2006.01)
*B01J 20/06* (2006.01)
(Continued)

(52) U.S. Cl.
CPC ........ *C10G 25/003* (2013.01); *B01J 20/0225* (2013.01); *B01J 20/0244* (2013.01);
(Continued)

(58) Field of Classification Search
CPC ... B01J 20/00; B01J 21/00; B01J 21/02; B01J 21/04; B01J 20/30; B01J 23/00;
(Continued)

(56) References Cited

U.S. PATENT DOCUMENTS

| 4,990,318 A | * | 2/1991 | Kidd | ...................... | B01D 53/48 210/749 |
| 5,094,996 A | * | 3/1992 | Kidd | ...................... | B01D 53/48 502/329 |

(Continued)

OTHER PUBLICATIONS http://bcn.boulder.co.us/basin/waterworks/gasolinecomp.pdf, retrieved Jul. 25, 2016 (citing Ground Water Management Review, Spring, 1990, p. 167).*

(Continued)

*Primary Examiner* — Renee Robinson
*Assistant Examiner* — Derek Mueller
(74) *Attorney, Agent, or Firm* — Oblon, McClelland, Maier & Neustadt, L.L.P.

(57) ABSTRACT

Alumina/NiO/ZnO and Alumina/ZnO are synthesized via a novel modified hydrothermal method and investigated for the desulfurization activities. Sulfur compounds such as thiophene, benzothiophene (BT) and dibenzothiophene (DBT) are tested for their removal from model diesel fuel. The prepared composite materials were examined by the means of $N_2$-adsorption, X-ray diffraction and Fourier transform infrared spectroscopy.

10 Claims, 5 Drawing Sheets

XRD for Alumina\NiO\ZnO

(51) Int. Cl.
*B01J 20/08* (2006.01)
*B01J 20/30* (2006.01)
*C10G 25/09* (2006.01)
*B01J 20/28* (2006.01)
*B01J 20/02* (2006.01)

(52) U.S. Cl.
CPC ............... *B01J 20/06* (2013.01); *B01J 20/08* (2013.01); *B01J 20/28059* (2013.01); *B01J 20/28071* (2013.01); *B01J 20/28073* (2013.01); *B01J 20/28085* (2013.01); *B01J 20/3078* (2013.01); *C10G 25/09* (2013.01); *B01J 2220/42* (2013.01)

(58) Field of Classification Search
CPC .... B01J 20/3078; C10G 25/003; C10G 25/00; C10G 25/09
See application file for complete search history.

(56) References Cited

U.S. PATENT DOCUMENTS 6,254,766 B1 * 7/2001 Sughrue .................. B01J 20/06
                                                          208/208 R
6,429,170 B1    8/2002 Dodwell

OTHER PUBLICATIONS

Wang, G., et al., Reactive Characteristics and Adsorption Heat of Ni/ZnO-SiO2-Al2O3 Adsorbent by Reactive Adsorption Desulfurization, Ind. Eng. Chem. Res., 2011, vol. 50, p. 12449-12459.*

* cited by examiner

XRD for Alumina\NiO\ZnO

METHOD USING ALUMINA-ZINC OXIDE-NICKEL OXIDE COMPOSITE FOR DESULFURIZATION OF HYDROCARBONS

CROSS REFERENCE TO RELATED APPLICATIONS

This application is a Divisional of U.S. patent application Ser. No. 14/144,114 filed Dec. 30, 2013.

BACKGROUND OF THE INVENTION

Technical Field

The present invention relates to an alumina/NiO/ZnO and an alumina/ZnO composite, a method in which the composites are obtained, and a method in which the composites are used as adsorbents in a method of desulfurization of diesel fuel.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The demand for transportation fuels has been increasing in most countries for the past two decades, and the diesel fuel demand is expected to increase significantly in the future (Brady, A. "Global Refining Margins Look Poor in Short Term, Buoyant Later Next Decade," Oil Gas J., 1999, 97 (46), 75-80—incorporated herein by reference in its entirety). Crude oil, a complex mixture of organic liquids, is considered the largest source of energy and the major portions of the crude oils are used as transportation. Hetero atoms include sulfur (0-5%), nitrogen (0-0.2%), and other elements (e.g. oxygen, nickel, vanadium and iron) ranging from 0 to 0.1% weight and the sulfur content is expressed as a percentage of sulfur by weight based on the total weight of the crude oil and varies from less than 0.1% to greater than 5% depending on the type and source of crude oils (Gary, J. H., and Hand werk, G. E., "Petroleum Refining, Technology and Economics, Second Edition," Marcel Dekker, New York, 1998—incorporated herein by reference in its entirety).

It is known that, sulfur compounds present in fuels lead to the emission of sulfur oxide gases (SOx). These gases react with water in the atmosphere to form sulfates and acid rain which damages buildings, destroys automotive paint finishes, acidifies soil, and ultimately leads to loss of forests and various other ecosystems (W. L. Fang, Inventory of U. S. "Greenhouse Gas Emissions and Sinks, 1990-2003," Clean Air Markets Division, 2004—incorporated herein by reference in its entirety). Even traces of sulfur compounds present in diesel fuels poisons the oxidative catalyst used in the emission control system and reduces their effectiveness for the oxidation of harmful carbon monoxide, hydrocarbons and volatile organic matter. Sulfur emissions also cause severe human health such as, respiratory illnesses, aggravate heart disease, trigger asthma, and contribute to formation of atmospheric particulates (Vimal Chandra Srivastava, "An evaluation of desulfurization technologies for sulfur removal from liquid Fuels," RSC Advances, 2012, 2, 759-783—incorporated herein by reference in its entirety), global warming and water pollution (Venner S F, "EU environmental laws impact fuels' requirements," Hydrocarb Process 2000; 79:51-7—incorporated herein by reference in its entirety). Environmental regulations have been introduced in many countries around the world to reduce the sulfur content in diesel fuel to ultra low levels of 10 ppm (US EPA, Diesel Fuel Quality: Advance Notice of Proposed Rulemaking, EPA420-F-99-011, Office of Mobile Sources, May 1999—incorporated herein by reference in its entirety).

In an attempt to achieve sulfur levels less than 10 ppm, there are several emerging trends towards minimizing sulfur content in transportation fuels. In comparison to various desulfurization techniques, adsorption is considered to be an efficient and economical way for removing organosulfur compounds due to its low-energy consumption, and works at ambient conditions. Adsorption is the most common hydrodesulphurization (HDS) alternative method currently used to achieve ultra-clean fuels (Tymchyshyn M., "Deep Desulphurization of Diesel Fuels," Lakehead University, April (2008)—incorporated herein by reference in its entirety).

A variety of adsorbents such as ion-exchanged zeolites, supported metals, metal oxides, activated carbons, alumina, ionic liquids (C. S. Song, "An overview of new approaches to deep desulfurization for ultra-clean gasoline, diesel fuel and jet fuel," Catal. Today, 86 (2003) 211-263; Y. S. Shen, et al., "Selective adsorption for removing sulfur: a potential ultra-deep desulfurization approach of jet fuels," RSC Adv., 2(2012) 1700-1711—each incorporated herein by reference in its entirely) and other commercial adsorbents have been reported for the adsorptive desulfurization under ambient conditions. Activated alumina has a good adsorptive properties for the removal of organic compound from aqueous solutions (A. K. Bajpai, et al., "Studies on the adsorption of sulfapyridine at the solution-alumina interface, J. Colloid Interface Sci. 187 (1997) 96-104—each incorporated herein by reference in its entirety). Srivastava et al. (A. Srivastav, V. C. Srivastava, Adsorptive desulfurization by activated alumina Journal of Hazardous Materials 170 (2009) 1133-1140—incorporated herein by reference in its entirety) investigated the removal of DBT dissolved in n-hexane by commercial grade activated alumina (aluminum oxide) as adsorbent. Kim et al. (J. H. Kim, et al., "Ultra-deep desulfurization and denitrogenation of diesel fuel by selective adsorption over three different adsorbents: a study on adsorptive selectivity and mechanism," Catal. Today 111 (2006) 74-83—incorporated herein by reference in its entirety) studied the adsorptive desulfurization using a model diesel fuel over three typical adsorbents (activated carbon, activated alumina and nickel-based adsorbent) in a fixed-bed adsorption system.

To improve adsorption capacity of alumina for removing sulfur-containing compounds in fuels, the surface chemistry, as well as the pore structure of activated alumina, can be modified (Jeevanandam P, et al., "Adsorption of thiophenes out of hydrocarbons using metal impregnated nanocrystalline aluminum oxide," Micropor Mesopor Mater 2005:101-10—incorporated herein by reference in its entirety). Recently, Wang et al. (J. Wang, et al., "Alumina-supported manganese oxide sorbent prepared by sub-critical water impregnation for hot coal gas desulfurization," Fuel Processing Technology (2013)—incorporated herein by reference in its entirety) investigated the removal of $H_2S$ from hot coal gas by Alumina-supported manganese oxide sorbents. It is reported that Nickel has an affinity to the organic sulfur compounds and it is the active sites on Ni/ZnO for desulfurization process, where the organic sulfur compounds in the diesel are decomposed on the surface Ni of Ni/ZnO to form $Ni_3S_2$ (Huntley, D. R. et al., "Desulfurization of Thiophenic Compounds by Ni(111): Adsorption and Reactions of Thiophene, 3-Methylthiophene, and 2,5-Dimethylthiophene," J. Phys. Chem. 1996, 100, 19620-19627; Novochinskii, C. Song, et al., "Low-Temperature H2S Removal from Steam-Containing Gas Mixtures with ZnO for Fuel Cell Application. 1. ZnO Particles and Extrudates.", Energy Fuels 18 (2004) 584; A. Ryzhikov et al. "Reactive adsorption of thiophene on Ni/ZnO: Role of hydrogen pretreatment and nature of the rate determining step," Applied Catalysis B: Environmental 84 (2008) 766-772; L. Huang et al, "In situ XAS study on the mechanism of reactive adsorption desulfurization of oil product over Ni/ZnO," Applied Catalysis B: Environmental 106 (2011) 26-38—each incorporated herein by reference in its entirety). Zinc oxide is also reported to be one of the most practical metal species for adsorptive desulfurization because of its large interaction with sulfur impurities and it has the highest equilibrium constant for sulfidation (I. Rosso, et al., "Zinc oxide sorbents for the removal of hydrogen sulfide from syngas," Ind. Eng. Chem. Res. 42 (2003) 1688-1697—incorporated herein by reference in its entirety).

Ayala et al (R. E. Ayala, D. W. Marsh, Characterization and long-range reactivity of zinc ferrite in high-temperature desulfurization processes, Industrial and Engineering Chemistry Research 30 (1991) 55-60—incorporated herein by reference in its entirety) reported that zinc oxide with a very high equilibrium constant has high precision and shows stable and reliable performance in removing $H_2S$.

The need for cleaner burning fuels has resulted in a continuing world-wide effort to reduce sulfur levels in hydrocarbon-containing fluids such as gasoline and diesel fuels. The reduction of sulfur in such hydrocarbon-containing fluids is considered to be a means for improving air quality because of the negative impact the sulfur has on the performance of sulfur-sensitive items such as automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Most of the sulfur in a hydrocarbon-containing fluid such as gasoline comes from thermally processed gasolines. Thermally processed gasolines such as, for example, thermally cracked gasoline, visbreaker gasoline, coker gasoline and catalytically cracked gasoline (hereinafter collectively referred to as "cracked-gasoline") contains, in part, olefins, aromatics, sulfur, and sulfur-containing compounds.

Since most gasolines, such as for example automobile gasolines, racing gasolines, aviation gasolines, boat gasolines, and the like contain a blend of, at least in part, cracked-gasoline, reduction of sulfur in cracked-gasoline will inherently serve to reduce the sulfur levels in most gasolines such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the real debate has focused on the required level of reduction, the geographical areas in need of lower sulfur gasoline, and the time frame for implementation.

As the concern over the impact of automotive air pollution continues, it is clear that further efforts to reduce the sulfur levels in automotive fuels will be required. While the current gasoline products contain about 330 parts per million (ppm), the U.S. Environmental Protection Agency recently issued regulations requiring the average sulfur content in gasoline to be less than 30 ppm average with an 80 ppm cap. By 2006, the standards will effectively require every blend of gasoline sold in the United States to meet the 30 ppm level.

Desulfurization preferably has a minimal effect on the olefin content of such fuels so as to maintain the octane number (both research and motor octane number). Such a process would be desirable since saturation of olefins greatly affects the octane number. Such adverse effect on olefin content is generally due to the severe condition normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur-containing compounds to be removed from cracked-gasoline. In addition, there is a need to avoid a system wherein the conditions are such that the aromatic content of the cracked-gasoline is also lost through saturation. Thus, there is a need for a process wherein desulfurization is achieved and the octane number is maintained.

There is also a need to reduce the sulfur content in diesel fuels. In removing sulfur from diesel fuels by hydrodesulfurization, the cetane is improved but there is a large cost in hydrogen consumption. Such hydrogen is consumed by both hydrodesulfurization and aromatic hydrogenation reactions.

Conventional desulfurization requires a significant consumption of hydrogen and has poor economical performance process for the treatment of cracked gasolines and diesel fuels.

As a result of the lack of success in providing a successful and economically feasible process for the reduction of sulfur levels in cracked-gasolines and diesel fuels, it is apparent that there is still a need for a better process for the desulfurization of such hydrocarbon-containing fluids which has minimal effect on octane levels while achieving high levels of sulfur removal.

The present invention addresses the deficiencies of conventional materials by providing Alumina-NiO—ZnO and Alumina-ZnO composites for the desulfurization and removal of thiophene, benzothiophene and dibenzothiophene from model diesel fuel.

Traditionally, sorbent compositions used in processes for the removal of sulfur from hydrocarbon-containing fluids have been agglomerates utilized in fixed bed applications. Because of the various process advantages of fluidized beds, hydrocarbon-containing fluids are sometimes used in fluidized bed reactors. Fluidized bed reactors have advantages over fixed bed reactors such as better heat transfer and better pressure drop. Fluidized bed reactors generally use reactants that are particulates. The size of these particulates is generally in the range of about 1 micron to about 1000 microns. However, the reactants used generally do not have sufficient attrition resistance for all applications. Consequently, finding a sorbent with sufficient attrition resistance that removes sulfur from these hydrocarbon-containing fluids and that can be used in fluidized, transport, moving, or fixed bed reactors is desirable and would be of significant contribution to the art and to the economy.

BRIEF SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In the present invention, a metal-oxide/NiO/ZnO composite is synthesized by a hydrothermal method.

In another embodiment, the metal-oxide/NiO/ZnO composite has a surface area of about 12.4 m²/g, a pore volume of about 0.162 cm³/g, and an adsorption average pore width of about 520 Å. In another embodiment, a metal-oxide/ZnO composite is synthesized by a hydrothermal method.

In another embodiment, the metal-oxide/ZnO composite has a surface area of about 12.4 m²/g, a pore volume of about 0.211 cm³/g, and an adsorption average pore width of about 540 Å. In another embodiment, the metal-oxide/NiO/ZnO and metal-oxide/ZnO composites are used in a desulfurization method.

In another embodiment, an alumina/NiO/ZnO composite is synthesized by a hydrothermal method.

In another embodiment, the alumina/NiO/ZnO composite has a surface area of about 12.4 m²/g, a pore volume of about 0.162 cm³/g, and an adsorption average pore width of about 520 Å. In another embodiment, an alumina/ZnO composite is synthesized by a hydrothermal method.

In another embodiment, the alumina/ZnO composite has a surface area of about 12.4 m²/g, a pore volume of about 0.211 cm³/g, and an adsorption average pore width of about 540 Å. In another embodiment, the alumina/NiO/ZnO and Alumina/ZnO composites are used in a desulfurization method.

In another embodiment, the composites are used to absorb and determine the sulfur-containing content in model diesel fuel.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
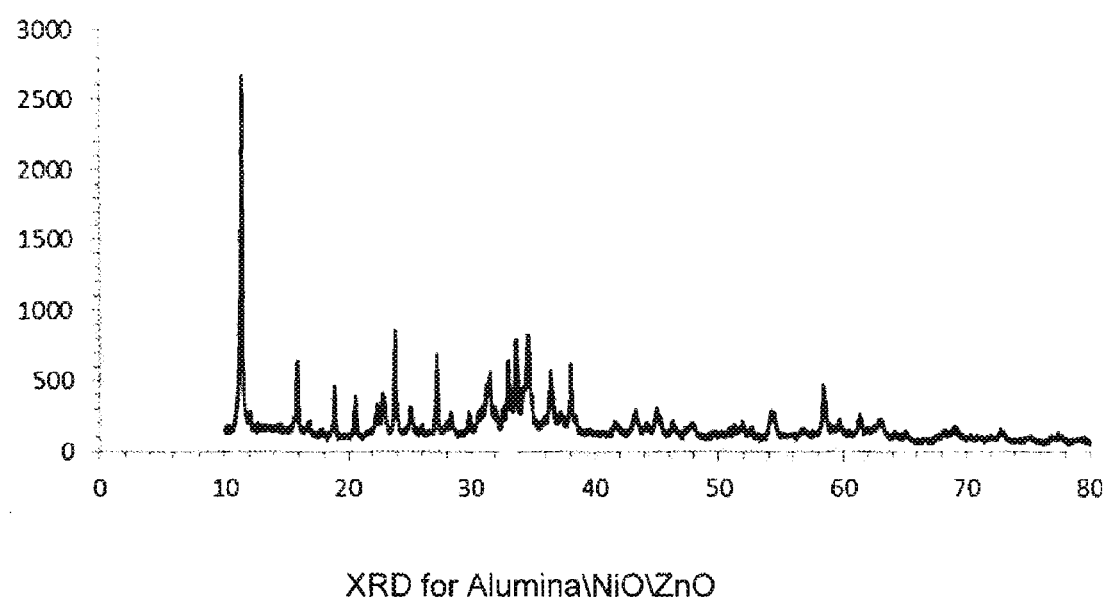
FIG. 1 is an XRD for alumina/NiO/ZnO.

Referring now to the drawings, wherein like reference numerals designate identical or corresponding parts throughout the several views.

The present invention relates to a hydrothermal method for obtaining an alumina/NiO/ZnO material. The hydrothermal method may further include thermal, chemical, and mechanical treatments to obtain the desired material.

First, a metal oxide is dispersed in a solution. The following can include one or more of (1) a refractory inorganic oxide such as an alumina, a magnesia, a titania, a zirconia, a chromia, a zinc oxide, a thoria, a boria, a silica-alumina, a silica-magnesia, a chromia-alumina, an alumina-boria, and a silica-zirconia; (2) a ceramic, a porcelain, and a bauxite; (3) a silica, a silica gel, a silicon carbide, a clay and a synthetically prepared or naturally occurring optionally acid-treated silicate; (4) a crystalline zeolitic aluminosilicate, such as an X-zeolite, a Y-zeolite, a mordenite, and an L-zeolite, either in hydrogen form or preferably in nonacidic form; and (5) a non-zeolitic molecular sieve, such as an aluminophosphate or a silico-alumino-phosphate. Preferably, the metal oxide is alumina (aluminium (III) oxide) with the chemical composition of $Al_2O_3$. A suitable alumina material may include a crystalline alumina known as the gamma-, eta-, and theta-alumina, with gamma- or eta-alumina being the most preferred. Alumina is dispersed in a solution comprising water and a hydrocarbon based molecule with a single —OH functional group (e.g. an alcohol compound). The alcohol compound includes but is not limited to methanol ($CH_3CH_2OH$), propanol ($CH_3CH_2CH_2OH$), butanol ($C_4H_9OH$), pentanol ($C_5H_{11}OH$), hexanol ($C_6H_{13}OH$), heptanol ($CH_3(CH_2)_6OH$), octanol ($CH_3(CH_2)_7OH$), nonanol ($CH_3(CH_2)_8OH$), decanol ($C_{10}H_{21}OH$) and any isomers thereof. Preferably, the alcohol compound is ethanol.

The metal oxide may be added to the solution at a mass range of 0.01-15.0 g, 2.0-10.0 g, and 3-8 g per a volume of solution in the range of 5-30 mL, 8-20 mL or 12-15 mL. Preferably, 5.0 g of the metal oxide is added to a solution containing a volume of 10 mL. The water and alcohol-containing solution may be prepared in a volume to volume (water to alcohol) ratio of 10:1, 5:2 and 1:1. Preferably, the water to alcohol ratio is a 1:1 volume ratio. Preferably the alcohol is at least 10%, 20%, 30%, 40%, or 50% in water based on the total amount of water and alcohol. Preferably, the alcohol is 50% in water. Further, the solution contains a mass concentration of metal oxide in the range of 0.01-0.5 g/mL. Preferably, the mass concentration of the metal oxide in the water and alcohol solution is 0.5 g/mL. As a separate step, a zinc compound and a nickel compound, e.g., $Zn(NO_3)_2 \cdot 6H_2O$ and $Ni(NO_3)_2 \cdot 6H_2O$, are mixed to form a solution. Other Zn compounds include zinc carbonate ($ZnCO_3$), zinc sulfate ($ZnSO_4$) and zinc chloride ($ZnCl_2$). $Zn(NO_3)_2 \cdot 6H_2O$ is added in the range of 1-10 g, 2-8 g, and 3-6 g per a volume of solution in the range of 20-100 mL, 30-80 mL, or 35-50 mL. Preferably 5 g of $Zn(NO_3)_2 \cdot 6H_2O$ is added to the solution containing a volume of 40 mL. $Ni(NO_3)_2 \cdot 6H_2O$ is added in the range of 0.1-5 g, 0.5-4 g, and 0.8-3 g. Preferably 2 g of $Ni(NO_3)_2 \cdot 6H_2O$ is added in the solution.

The mixed solution of $Zn(NO_3)_2 \cdot 6H_2O$ and $Ni(NO_3)_2 \cdot 6H_2O$ is then mixed with an aqueous solution. Adding the $Zn(NO_3)_2 \cdot 6H_2O$ and $Ni(NO_3)_2 \cdot 6H_2O$ to an aqueous solution dissolves both the $Zn(NO_3)_2 \cdot 6H_2O$ and $Ni(NO_3)_2 \cdot 6H_2O$. Further, the solution contains a mass concentration in the range of 0.01-0.5 g/mL. Preferably, the mass concentration of the $Zn(NO_3)_2 \cdot 6H_2O$ and $Ni(NO_3)_2 \cdot 6H_2O$ in the aqueous solution is 0.175 g/mL.

Next, the $Zn(NO_3)_2 \cdot 6H_2O$ and $Ni(NO_3)_2 \cdot 6H_2O$ in the aqueous solution is mixed with the dissolved metal oxide-containing solution. Ammonia or another base is added to the solution to maintain the pH of the liquid mixture. The volume of ammonia added is such that the pH of the mixed solution is no less than 6. The solution is mixed to create a homogeneous mixture of the compounds. Manual methods and mechanical methods may be used to mix the solution. Manual methods of mixing may be used to mix the solution including but not limited to swirling the solution by hand and by placing a magnetic stir bar in the solution and stirring with a magnetic stir plate. Mechanical methods include but are not limited to sonicating the solution using an ultrasonic bath or an ultrasonic probe or ultrasonicating the solution. Preferably, ultrasonication is used. Ultrasonication in the presence of a solvent enhances the absorbivity of the $Zn(NO_3)_2 \cdot 6H_2O$ and $Ni(NO_3)_2 \cdot 6H_2O$ nanoparticles by improving their dispersion within the solvent and optimizes conditions for removal of the sulfur-containing compounds once they react with the solution during desulfurization. The solution is ultrasonicated at a frequency of >20 kHz, more preferably between 20-30 kHz. The ultrasonicator functions at a power within the range of 100-1500 W, 200-1300 W, or 300-800 W. More preferably, the ultrasonicator functions at a power between 300-800 W. The solution is ultrasonicated for a time period ranging from 30-100 minutes, 40-80 minutes, and 50-65 minutes. Preferably the solution is ultrasonicated for 60 minutes.

Following the method of mixing, the solution undergoes a heating treatment. The solution is heated at a temperature range of 50-98° C., 60-95° C., or 70-90° C. over a time period ranging from 10-20 hours, 11-18 hours, or 12-15 hours. Preferably the solution is heated at 90° C. and over a time period of 12 hours.

Following the heating treatment, the sample is dried. Methods of drying include allowing the sample to air dry over a time period of no more than twelve hours and drying the sample in an oven. Preferably, the sample is dried in an oven at a temperature ranging from 20-80° C., 30-70° C., and 40-55° C. Preferably the sample is heated at 50° C.

Following drying, the sample undergoes calcination. Calcination can be carried out in shaft furnaces, rotary kilns, multiple hearth furnaces, and/or fluidized bed reactors. Calcination is conducted over a time period of 1-4 hours, 1.25-3 hours, or 1.5-2.5 hours at a temperature ranging from 300-600° C., 325-650° C., or 350-500° C. Preferably calcination is conducted over 2 hours at a temperature ranging from 350-500° C. Calcination allows for thermal treatment of the sample in which the desired alumina/NiO/ZnO material is separated from the organic material of the sample.

The resulting material contains a mixture of a metal oxide/NiO/ZnO, preferably alumina/NiO/ZnO. The preferred material composition includes but is not limited to the following compositional ranges: 5-25% alumina, 50-95% NiO, and 0-25% ZnO or 10-50% alumina, 50-100% NiO, and 40-50% ZnO or 15-30% alumina, 70-95% NiO, and 15-30% ZnO or 5-20% alumina, 80-95% NiO, and 5-20% ZnO or 0-20% alumina, 80-100% NiO, and 0-20% ZnO. The surface area of the alumina/NiO/ZnO material is in the range of 10-15 $m^2/g$, 11-14 $m^2/g$, and 12-13 $m^2/g$. Preferably the surface area of the alumina/NiO/ZnO material is about 12.4 $m^2/g$. The pore volume as defined as the spaces in a material, and the fraction of the volume of voids over the total volume of the alumina/NiO/ZnO is in the range of 0.05-1 $cm^3/g$, 0.1-0.8 $cm^3/g$, and 0.15-0.4 $cm^3/g$. Preferably, the pore volume of the alumina/NiO/ZnO is about 0.162 $cm^3/g$. The adsorption average pore width of the alumina/NiO/ZnO material is 500-600 Å, 510-590 Å, and 515-530 Å. Preferably, the adsorption average pore width of the alumina/NiO/ZnO material is 520 Å.

Example: Preparation of Alumina/NiO/ZnO Adsorbent

The composite adsorbent (alumina/NiO/ZnO) was prepared via thermal precipitation method. One example is presented here. 5.0 g of alumina was dispersed in water and ethanol 1:1 (v/v) solution. On the other side, a mixed solution of 5.0 g of $Zn(NO_3)_2 \cdot 6H_2O$ and 2.0 g of $Ni(NO_3)_2 \cdot 6H_2O$ was dissolved in water. The solution was added into the dispersed alumina solution and mixed under sonication for 60 min followed by heating at 90° C. for 12 h. Then, it was cooled to room temperature and filtered. The sample was finally dried in oven at 50° C. Calcination of the material was conducted for 2 h at 350-500° C. Different ratio of the three components were investigated.

In another embodiment of the invention, a hydrothermal method is used for obtaining an alumina/ZnO material. The hydrothermal method may further include thermal, chemical, and mechanical treatments to obtain the desired material.

First, a metal oxide is dispersed in a solution. The following can include one or more of (1) a refractory inorganic oxide such as an alumina, a magnesia, a titania, a zirconia, a chromia, a zinc oxide, a thoria, a boria, a silica-alumina, a silica-magnesia, a chromia-alumina, an alumina-boria, and a silica-zirconia; (2) a ceramic, a porcelain, and a bauxite; (3) a silica, a silica gel, a silicon carbide, a clay and a synthetically prepared or naturally occurring optionally acid-treated silicate; (4) a crystalline zeolitic aluminosilicate, such as an X-zeolite, a Y-zeolite, a mordenite, and an L-zeolite, either in hydrogen form or preferably in nonacidic form; and (5) a non-zeolitic molecular sieve, such as an aluminophosphate or a silico-alumino-phosphate. Preferably, the metal oxide is alumina (aluminium (III) oxide) with the chemical composition of $Al_2O_3$. A suitable alumina material may include a crystalline alumina known as the gamma-, eta-, and theta-alumina, with gamma- or eta-alumina being the most preferred. Alumina is dispersed in a solution comprising water and a hydrocarbon based molecule with a single —OH functional group (e.g. an alcohol compound). The alcohol-containing compound includes but is not limited to methanol ($CH_3CH_2OH$), propanol ($CH_3CH_2CH_2OH$), butanol ($C_4H_9OH$), pentanol ($C_5H_{11}OH$), hexanol ($C_6H_{13}OH$), heptanol ($CH_3(CH_2)_6OH$), octanol ($CH_3(CH_2)_7OH$), nonanol ($CH_3(CH_2)_8OH$), decanol ($C_{10}H_{21}OH$) and any isomers thereof. Preferably, the alcohol compound is ethanol.

The metal oxide may be added to the solution at a mass range of 0.01-15.0 g, 2.0-10.0 g, and 3-8 g per a volume of solution in the range of 5-30 mL, 8-20 mL or 12-15 mL. Preferably, 5.0 g of the metal oxide is added to a solution containing a volume of 10 mL. The water and alcohol-containing solution may be prepared in a volume to volume (water to alcohol) ratio of 10:1, 5:2 and 1:1. Preferably, the water to alcohol ratio is a 1:1 volume ratio. Preferably the alcohol is at least 10%, 20%, 30%, 40%, or 50% in water. Preferably, the alcohol is 50% in water based on the total amount of water and alcohol. Further, the solution contains a mass concentration of metal oxide in the range of 0.01-0.5 g/mL. Preferably, the mass concentration of the metal oxide in the water and alcohol solution is 0.5 g/mL.

As a separate step, a zinc compound, e.g. $Zn(NO_3)_2 \cdot 6H_2O$, is dissolved in water. Other Zn compounds include zinc carbonate ($ZnCO_3$), zinc sulfate ($ZnSO_4$) and zinc chloride ($ZnCl_2$). $Zn(NO_3)_2 \cdot 6H_2O$ is added in the range of 1-10 g, 2-8 g, and 3-6 g per a volume of solution in the range of 20-100 mL, 30-80 mL, or 35-50 mL. Preferably 5 g of $Zn(NO_3)_2 \cdot 6H_2O$ is added to the solution containing a volume of 40 mL. Preferably 5 g of $Zn(NO_3)_2 \cdot 6H_2O$ is added to water. The volume of water is such that the pH of the mixed solution of $Zn(NO_3)_2 \cdot 6H_2O$ and water is no less than 6.

Next, the $Zn(NO_3)_2 \cdot 6H_2O$ in the aqueous solution is mixed with the dissolved metal oxide-containing solution. The solution is mixed to create a homogeneous mixture of the compounds. Manual methods and mechanical methods may be used to mix the solution. Manual methods of mixing may be used to mix the solution including but not limited to swirling the solution by hand and by placing a magnetic stir bar in the solution and stirring with a magnetic stir plate. Mechanical methods include but are not limited to sonicating the solution using an ultrasonic bath or an ultrasonic probe or ultrasonicating the solution. Preferably, ultrasonication is used. Ultrasonication in the presence of a solvent enhances the absorbivity of the $Zn(NO_3)_2 \cdot 6H_2O$ and nanoparticles by improving their dispersion within the solvent and optimizes conditions for removal of the sulfur-containing compounds once they react with the solution during desulfurization. The solution is ultrasonicated at a frequency of >20 kHz, more preferably between 20-30 kHz. The ultrasonicator functions at a power within the range of 100-1500 W, 200-1300 W, or 300-800 W. More preferably, the ultrasonicator functions at a power between 300-800 W. The solution is ultrasonicated for a time period ranging from 30-100 minutes, 40-80 minutes, and 50-65 minutes. Preferably the solution is ultrasonicated for 60 minutes.

Following the method of mixing, the solution undergoes a heating treatment. The solution is heated at a temperature range of 50-98° C., 60-95° C., or 70-90° C. over a time period ranging from 10-20 hours, 11-18 hours, or 12-15 hours. Preferably the solution is heated at 90° C. and over a time period of 12 hours.

Following the heating treatment, the sample is dried. Methods of drying include allowing the sample to air dry over a time period of no more than twelve hours and drying the sample in an oven. Preferably, the sample is dried in an oven at a temperature ranging from 20-80° C., 30-70° C., and 40-55° C. Preferably the sample is heated at 50° C.

Following drying, the sample undergoes calcination. Calcination can be carried out in shaft furnaces, rotary kilns, multiple hearth furnaces, and/or fluidized bed reactors. Calcination is conducted over a time period of 1-4 hours, 1.25-3 hours, or 1.5-2.5 hours at a temperature ranging from 300-600° C., 325-650° C., or 350-500° C. Preferably calcination is conducted over 2 hours at a temperature ranging from 350-500° C. Calcination allows for thermal treatment of the sample in which the desired alumina/NiO/ZnO material is separated from the organic material of the sample.

The resulting material contains a mixture of a metal oxide/ZnO, preferably alumina/ZnO. The preferred material composition includes but is not limited to the following compositional ranges: 1-25% alumina and 75-99% ZnO or 1-50% alumina and 50-99% ZnO or 25-50% alumina and 50-75% ZnO or 50-75% alumina and 25-50% ZnO or 10-20% alumina and 80-90% ZnO. The surface area of the alumina/ZnO material is in the range of 10-20 $m^2/g$, 11-18 $m^2/g$, and 12-17 $m^2/g$. Preferably the surface area of the alumina/ZnO material is 12.4 $m^2/g$. The pore volume as defined as the spaces in a material, and the fraction of the volume of voids over the total volume of the alumina/ZnO is in the range of 0.05-1 $cm^3/g$, 0.1-0.8 $cm^3/g$, and 0.15-0.4 $cm^3/g$. Preferably, the pore volume of the alumina/ZnO is about 0.211 $cm^3/g$. The adsorption average pore width of the alumina/ZnO material is 500-600 Å, 510-590 Å, and 515-550 Å. Preferably, the adsorption average pore width of the alumina/ZnO material is 540 Å.

Example: Preparation of Alumina/ZnO Adsorbent

The alumina/ZnO composite adsorbent was prepared via thermal precipitation method. This was realized by dispersion of 5.0 g of alumina in water and ethanol 1:1 (v:v) solution. On the other side, a mixed solution of 5.0 g of $Zn(NO_3)_2 \cdot 6H_2O$ was dissolving in water and its pH was controlled at higher than 6. The solution was added into the dispersed alumina solution and mixed under sonication for 60 min followed by heating at 90° C. for 12 h. Then, it was cooled to room temperature and filtered. The sample was finally dried in oven at 50° C. Calcination of the material was conducted for 2 h.

The characterizations of composite adsorbents were performed by using different techniques. Specific surface areas and pore volumes were determined by $N_2$ adsorption (BET). The characterization of the surface chemistry of the adsorbents and the surface morphology were performed X-ray diffraction spectroscopy (XRD) and Fourier Transform Infrared spectroscopy (FT-IR). Nitrogen sorption isotherms were performed at liquid nitrogen temperature (−196° C.) on a Micromeritics ASAP 2020 volumetric instrument to determine surface area (BET), pore volume and pore size distribution in the tested sorbents. The FT-IR analyses were done on the powdered samples with KBr addition. Spectra were recorded using a Nicolet 6700 spectrometer equipped with OMNIC program and (DTGS Br) detector. The spectra of the samples were recorded in transmission mode and the wavenumber range (4000-400 $cm^{-1}$). FTIR spectra were obtained by adding 64 scans with a resolution of 2 $cm^{-1}$ and corrected for the background noise. X-ray diffraction data were obtained on a "Shimadzu XRD Model 6000" diffractometer using Kα radiation of Cu and was operated at 40 kV and 30 mA. EDX patterns were obtained using (FESEM, Nova NanoSEM Ultra-High Resolution) operating at 20 kV with different magnification powers.

In another embodiment of the invention, the alumina/NiO/ZnO and alumina/ZnO materials are used as sorbents to adsorb sulfur-containing compounds by a method of desulfurization. The adsorption of sulfur-containing compounds includes but are not limited to dibenzothiophene (DBT), benzothiophene (BT), and thiophene.

In the method, the sulfur-containing compounds are adsorbed from model diesel fuel. A model diesel fuel solution is prepared by dissolving the sulfur containing compounds into a solvent. The solvent is prepared by mixing an aromatic-containing compound with an alkane. Preferably, the aromatic-containing compound contains at least one six-membered hydrocarbon ring with a $C_1$-$C_6$ alkyl group selected from the group consisting of methyl (—$CH_3$), ethyl (—$C_2H_5$), propyl (—$C_3H_7$), butyl (—$C_4H_9$), pentyl (—$C_5H_{11}$), or hexyl (—$C_6H_{13}$) where said alkyl unit is attached to one of the carbon units of said hydrocarbon ring. Preferably, the alkyl group is methyl and more preferably the aromatic solvent used is toluene. The alkane is selected from a $C_1$-$C_6$ group consisting of methane ($CH_4$), ethane ($C_2H_6$), propane ($C_3H$), butane ($C_4H_{10}$), pentane ($C_5H_{12}$), and hexane ($C_6H_{14}$). More preferably, the alkane used is hexane.

Once the solvent is mixed, different amounts of the sorbents are introduced to a model diesel fuel solution. Preferably, 100-300 mg, 110-250 mg, and 150-200 mg of DBT, BT and thiophene is used per about 4 mL of solvent. The desired sorbent is then introduced into the model fuel solution containing the sulfur-containing compounds DBT, BT, and thiophene with an initial concentration in the range of 450-650 mg/L, 500-600 mg/L, or 550-595 mg/L. Preferably, the initial concentration of sulfur-containing compounds in the model diesel fuel is 577 mg/L.

The resultant mixture is then induced into equilibrium by shaking at room temperature. Samples are then taken from the mixture at time intervals of 0, 10, 30, 50, and 70 minutes of time to be analyzed by GC-SCD method.

The alumina/NiO/ZnO sorbent proved to be more effective in removing sulfur-containing compounds in the process of desulfurization when compared to the alumina/ZnO sorbent. The alumina/NiO/ZnO has a smaller surface area and pore volume, but the presence of nickel enhances the efficiency of the particular sorbent in desulfurization.

The adsorption of DBT, BT and thiophene from model diesel on the newly developed sorbents was performed using batch modes. Different amounts, in the range between 0.1 to 1 g of adsorbent were introduced into 50 mL of the model fuel solution. The total DBT, BT and thiophene initial concentrations was 577 mg/L, prepared by dissolving 197 mg DBT, 190 mg BT and 190 mg Thiophene in 1L solvent (762 ml toluene+238 ml hexane). Thus, the amount of sulfur calculated in the fuel was 34.28 ppm, 45.39 ppm and 72.43 ppm, respectively. The resulting mixture was continuously shaken at room temperature until equilibrium. Aliquots were taken from the system at the pre-determined time intervals and analyzed by GC-SCD method.

The percentage removal of sulfur was calculated using the following Equation:

$$\% \text{ Removal} = \frac{C_o - C_e}{C_o} \times 100$$

Where $C_0$ is the initial sulfur concentration (mg/L), Ce is the sulfur concentration (mg/L) at equilibrium.

The adsorption (qe, mg/g) at equilibrium, was calculated by $$q_e = (C_o - C_e)\frac{V}{w}$$

Where, Co (mg/L) and Ce (mg/L) are the sulfur compound concentrations contained in the initial solution and at equilibrium, respectively; V (L) is the volume of the fuel solution; and w (mg) represents the weight of adsorbents.

FT-IR spectroscopy is a useful tool for showing the presence of functional groups in organic compounds. The absorption band at ~435 cm$^{-1}$ is the characteristic band of Ni—O stretching vibrational mode, and absorption bands at 3400 cm$^{-1}$ represent O—H mode; those at 2900 cm$^{-1}$ are C—H mode; those at 1380 and 1600 cm$^{-1}$ are the asymmetric and symmetric C=O stretching modes of zinc acetate; and that at 490 cm$^{-1}$ is the stretching mode of Zn—O.

For comparing 1 g from each adsorbent was added to two flasks contain 577 ppm sample and stirred for 80 minutes. The percent removal of thiophene, BT and DBT using alumina\NiO\ZnO and Alumina\ZnO adsorbents found to be significant. Although, alumina ZnO has larger BET surface area and pore volume, it is clear that Alumina\NiO\ZnO exhibited higher adsorption capacity for the three compounds which means that, the metal species located contribute to enhanced interactions. These results agree with previously reported data that Nickel has an affinity to the organic sulfur compounds and it is the active sites on Ni/ZnO for desulfurization process. FIG. 1 shows a typical Alumina\NiO\ZnO x-ray diffractogram of composite.

Figure 2:
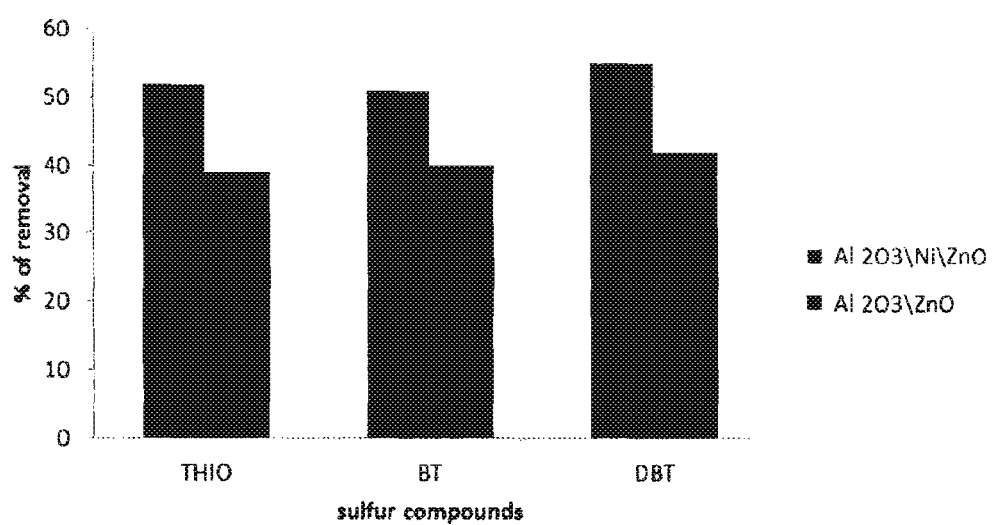
FIG. 2 is a graph of the percentage removal of thiophene, BT and DBT on alumina\NiO\ZnO and alumina/ZnO.

The results indicate that the amount of these compounds adsorbed by Alumina\NiO\ZnO is increased with the increasing amount of the adsorbent. Experimental results showed that the percent removal increased with increasing the amount of adsorbent. This can be attributed to the increase in surface area resulting from the increase in adsorbent mass or higher adsorption sites. Percentage removal of thiophene, BT and DBT on Alumina\NiO\ZnO and Alumina\ZnO is given in FIG. 2, where FIG. 2 is a graph illustrating the percentage removal of thiophene, BT and DBT on Alumina\NiO\ZnO and Alumina\ZnO (dosage 1 g, time 50 min, initial concentration 190, 190 and 197 ppm respectively).

Figure 3:
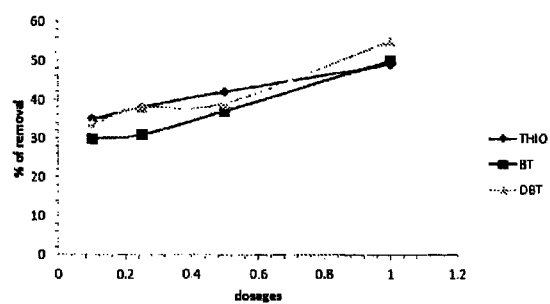
FIG. 3 is a graph of the effect of alumina/NiO/ZnO composite dosages on the adsorption of thiophene, BT and DBT.

FIG. 3 is a graph illustrating the effect of Alumina\NiO\ZnO composite dosages on the adsorption of thiophene, BT and DBT (with initial concentration 190, 190 and 197 ppm respectively) in 50 min. time.

Figure 4:
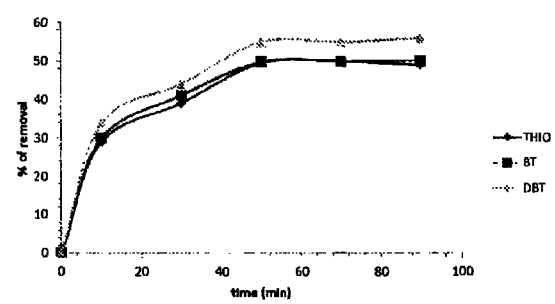
FIG. 4 is a graph of the percentage removal of thiophene, BT and DBT.

The sulfur adsorbed increased with time in the first 50 min as shown in FIG. 4, where FIG. 4 illustrates a graph of the percentage removal of thiophene, BT and DBT, versus time on 1 g Alumina\NiO\ZnO (with initial concentration 190, 190 and 197 ppm respectively). After that, the adsorbed amount almost did not change, indicating the equilibrium was reached. The fast adsorption at the initial stages may be due to availability of the uncovered surface and active sites on the adsorbent surface.

Figure 5:
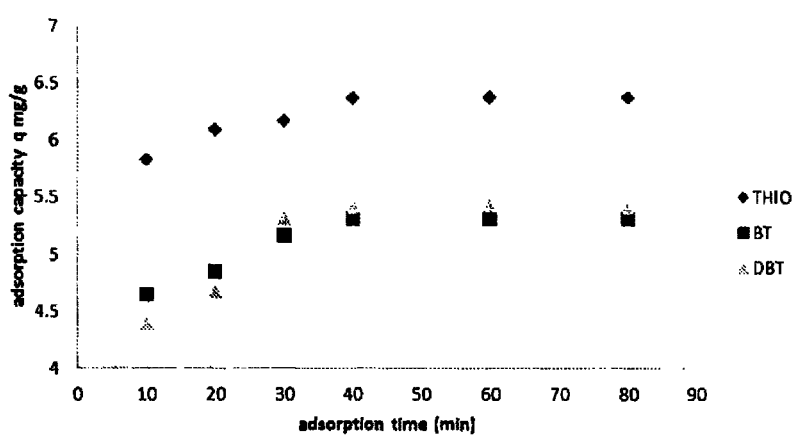
FIG. 5 is a graph of the effect of adsorption time on the adsorptive capacity of alumina/NiO/ZnO at ambient conditions.

The effects of adsorption time on the adsorptive capacity of Alumina\NiO\ZnO composite at ambient conditions were also studied as shown in FIG. 5, where FIG. 5 illustrates the effect of adsorption time on the adsorptive capacity of Alumina\NiO\ZnO at ambient conditions, employing a model fuel/adsorbent ratio of 50 mL/1 g. The sulfur absorbed increased with time in the first 50 min. After that, no significant adsorption was observed, indicating the equilibrium was reached and the equilibrium adsorption capacity was 6.5 mg-S/g-A (milligram of sulfur per gram of adsorbent).

Three kinetic models were applied for analysis of experimental kinetic data. The pseudo-first order, second-order kinetics and intraparticle diffusion model.

The pseudo-first-order equation was first given by Lagergrer. The Lagergren rate equation is expressed in the following equation:

$$\ln(q_e - q_t) = \ln q_e - k_1 t$$

where, qe (mg/g) and qt (mg/g) are the amounts of analyte adsorbed at equilibrium and time t (min), respectively; and $k_1$ (min$^{-1}$) is the rate constant of the Lagergren-first-order kinetics model.

Figure 6:
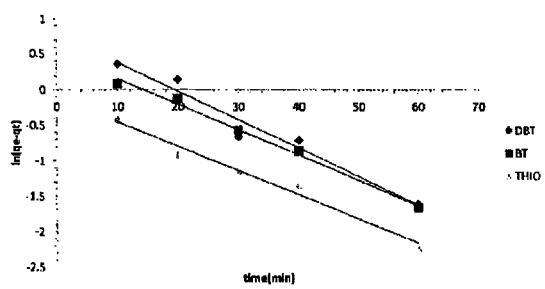
FIG. 6 is a graph of the first order Pseudo kinetics for adsorption of thiophene, BT and DBT by alumina/NiO/ZnO.

The $k_1$ and qe were calculated from the slope and intercept The plot of ln(qe–qt) versus t, respectively. The calculated qe are lower than the experimental values. As well as, The $R^2$ of the pseudo first order model are lower than the pseudo second order model, indicating that the adsorption of thiophene, BT and DBT on Alumina\NiO\ZnO does not obey the pseudo first order kinetic. The data is shown in FIG. 6, where FIG. 6 illustrates the first order Pseudo kinetics for adsorption of thiophene, BT and DBT by Alumina\NiO\ZnO.

The pseudo-second-order kinetics can be expressed as the following equation:

$$\frac{t}{q_t} = \frac{1}{k_2 q_e^2} + \frac{t}{q_e}$$

Where qt is the amount of adsorption THIO, BT and DBT (mg/g) at time t (min) and $k_2$ (g/(mg min)) is the adsorption rate constant of pseudo-second-order adsorption. The slope and intercept of the linear plots of t/qt against t yield the values of 1/qe and $1/k_2 qe^2$. Where $k_2 qe^2$ (mg/g·min) term is the initial adsorption rate at t=0.

The $k_2$ and qe can be obtained from the slope and intercept of plot of t/qt versus t. The pseudo second order model is based on the assumption that the rate limiting step may be chemisorption which involves valence forces by sharing or electron exchange between the adsorbent and the adsorbate.

Figure 7:
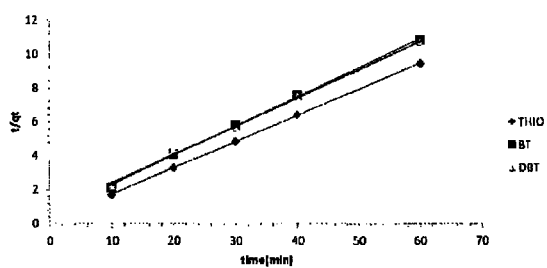
FIG. 7 is a graph of the second order Pseudo kinetics for adsorption of thiophene, BT and DBT by alumina/NiO/ZnO.

The maximum adsorption capacities qe calculated from the pseudo second order model are in accordance with the experimental values and higher correlation coefficient ($R^2$) indicate that the adsorption obeys a pseudo second order model. FIG. 7 displays the results obtained from pseudo-second-order model.

In the Intra-particle diffusion model, the time dependent intra-particle diffusion of components is described by Weber's kinetic model.

The experimental data for the adsorption of thiophene, BT, DBT onto Alumina\NiO\ZnO were fitted by the intraparticle diffusion model to identify the mechanism involved in the sorption process, which model is expressed as:

$$q_t = k_{id} t^{1/2} + C$$

Where C is the intercept and $k_{id}$ is the intraparticle diffusion rate constant (mg/g h$^{1/2}$) which can be evaluated from the slope of the linear plot of qt versus t½.

The calculated intraparticle diffusion coefficient $k_{id}$ values are listed in the Table 1, as shown below.

| compound | $q_{e, exp}$ (mg/g) | Pseudo-first order | | | Pseudo-second order | | | Intraparticle diffusion model | | |
|---|---|---|---|---|---|---|---|---|---|---|
| | | k1 | qe, cal | $R^2$ | k2 | qe, cal | $R^2$ | ki | C | $R^2$ |
| THIO | 6.49 | 0.033 | 1.12 | 0.976 | 0.107 | 6.6 | 0.999 | 0.113 | 5.52 | 0.954 |
| BT | 5.73 | 0.035 | 1.66 | 0.992 | 0.05 | 5.8 | 0.999 | 0.2 | 3.99 | 0.983 |
| DBT | 5.83 | 0.039 | 2.18 | 0.961 | 0.034 | 6.2 | 0.998 | 0.28 | 3.5 | 0.922 |

The larger the intercept, the greater the contribution of the surface sorption in the rate controlling step. If the regression of qt versus $t^{1/2}$ is linear and passes through the origin, then intraparticle diffusion is the sole rate-limiting step. However, the linear plots at each compound did not pass through the origin. This indicates that the intraparticle diffusion was not only rate controlling step.

A method is reported for preparing alumina\NiO\ZnO and Alumina\ZnO for desulfurization and removal of thiophene, benzothiophene (BT) and dibenzothiophene (DBT) from model diesel at ambient conditions. Alumina\NiO\ZnO has higher adsorption capacity which may be attributed to the present of NiO and zinc oxide and the interaction between the components. The results suggest that Alumina loaded with transition metal oxides may prove to be promising adsorbents for deep desulphurization processes. Further, the kinetic studies indicated that the adsorption process of Thiophene, BT and DBT on Alumina\NiO\ZnO follows the pseudo-second-order.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

The invention claimed is:

1. A method for desulfurizing a hydrocarbon composition, comprising:
    contacting an alumina/NiO/ZnO material with the hydrocarbon composition to adsorb one or more sulfur compounds present in the hydrocarbon composition on the alumina/NiO/ZnO material;
    wherein the alumina/NiO/ZnO material has a surface area of 10-15 $m^2/g$.

2. The method of claim 1 wherein the hydrocarbon composition is a mixture of an aromatic-containing compound and an alkane.

3. The method of claim 2 wherein the aromatic-containing compound is toluene and the alkane is hexane.

4. The method of claim 1 wherein the sulfur compounds are selected from the group consisting of dibenzothiophene, benzothiophene, and thiophene.

5. The method of claim 1 wherein the method has an adsorption time of 50 minutes.

6. The method of claim 1 wherein the one or more sulfur compounds are adsorbed at an adsorption rate that follows a pseudo second-order reaction rate.

7. The method of claim 1 wherein a concentration of the one or more sulfur compounds in the hydrocarbon composition is 450-650 mg/L.

8. The method of claim 1 wherein the alumina/NiO/ZnO material is contacted with the hydrocarbon composition at room temperature.

9. The method of claim 1 wherein the alumina/NiO/ZnO material has a pore volume of 0.1-0.8 $cm^3/g$.

10. The method of claim 1 wherein the alumina/NiO/ZnO material has an adsorption average pore width of 500-600 Å.

\* \* \* \* \*